UNITED STATES PATENT OFFICE.

ROBERT MAY CAFFALL, OF PHILADELPHIA, PENNSYLVANIA.

TREATING WATERPROOFED BUILDING MATERIAL.

SPECIFICATION forming part of Letters Patent No. 275,327, dated April 3, 1883.

Application filed January 5, 1883. (No specimens.)

*To all whom it may concern:*

Be it known that I, ROBERT MAY CAFFALL, a subject of the Queen of Great Britain and Ireland, and a resident of Philadelphia, Pennsylvania, have invented certain Improvements in Treating Waterproofed Building Materials, of which the following is a specification.

The object of my invention is to remove stains from bricks or other building materials.
The invention has been particularly designed for the cleansing of building materials waterproofed or to be waterproofed by the application thereto of paraffine or other water-repelling wax, or of a compound of which such wax is the basis—as, for example, the compound for which Letters Patent of the United States No. 230,919 were granted to me; but it will be understood that the invention may be applied to building materials which it is desired to cleanse without waterproofing.

The invention consists essentially in the application to building materials from which it is desired to remove dirt or stains, first, of paraffine or other wax heated to fluidity and applied, while hot, to the building material which is also (preferably) heated in any suitable manner—as, for example, by the use of the ordinary painter's blow-pipe, or by means of a furnace with open-grated front, such as that described in my Patent No. 253,505; and, secondly, in the application of a solvent of the wax, which serves to remove the wax, or such parts of it as are at or near the surface of the material being treated, and with the wax removes also the dirt or stain.

When paraffine-wax is used the solvent may be any of the light hydrocarbons, such as benzine, gasoline, naphtha, bisulphide of carbon, or kerosene, the last being the least expensive.
The solvent may be applied by rubbing the surface of the material being treated with a brush or cloth saturated with the solvent.

The stains which so frequently disfigure the walls of brick or stone buildings are mainly due to dirt occupying the pores of the material, and in carrying out my process this dirt is taken up by and mixed with the wax, and the subsequent removal of the wax by the solvent removes the dirt with it.

Where the dirt or stain is too deep to be readily or thoroughly removed by the above-recited process, oil or grease, with which the wax will combine or mix, is applied to the waxed surface after the application thereto of solvent sufficient to properly soften the wax. The oil or grease is next saponified by the application of an alkali—such as potash or soda—and the resulting mixture is then removed by washing, the dirt or stains being carried with it.

If the wax used in carrying out this process be paraffine or other water-repellent wax, or a compound having such wax as a basis, a reheating of the building material treated will cause the wax remaining in the pores of said material to fill said pores, (additional wax, heated to fluidity, being, if desired, applied for the purpose,) and the surface of the material may in this way be cleansed and made water and dirt repellent.

I claim as my invention—

1. The mode herein described of removing stains from building materials, said mode consisting in treating the material, first, with wax or a waxy compound, and, secondly, with a solvent of said wax, as set forth.

2. The mode described of removing stains from building materials, said mode consisting in applying thereto wax or a waxy compound, then softening said wax or compound by a suitable solvent, then applying oil or grease to combine or mix with the wax, then saponifying said oil or grease, and finally washing the surface, as set forth.

In testimony whereof I have signed my name to this specification in the presence of two subscribing witnesses.

ROBERT MAY CAFFALL.

Witnesses:
  THOMAS DUGAN,
  HARRY SMITH.